United States Patent [19]

Brucken et al.

[11] 4,133,186

[45] Jan. 9, 1979

[54] COMBINED ELECTRICAL CUT-OFF AND RELIEF VALVE

[75] Inventors: Byron L. Brucken, Miamisburg; Frank W. Hodits, Jr., Kettering, both of Ohio

[73] Assignee: General Motors Corporation, Detroit, Mich.

[21] Appl. No.: 842,455

[22] Filed: Oct. 17, 1977

[51] Int. Cl.$^2$ .............................................. F25B 1/00
[52] U.S. Cl. ........................................ 62/228; 62/190; 417/38
[58] Field of Search ................ 62/228, 190; 417/38 X

[56] References Cited

U.S. PATENT DOCUMENTS

| | | | |
|---|---|---|---|
| 3,460,559 | 8/1969 | Pullen et al. | 137/116.5 |
| 3,631,685 | 1/1972 | Young | 62/228 |
| 3,633,380 | 1/1972 | Peltizzetri | 62/228 |
| 3,933,005 | 1/1976 | Beltz | 62/228 |
| 4,038,506 | 7/1977 | Filip | 200/83 J |

Primary Examiner—William E. Wayner
Attorney, Agent, or Firm—Edward P. Barthel

[57] ABSTRACT

A combined over pressure relief and low fluid pressure electrical cut-off valve assembly having a housing defining a chamber with an inlet in communication with the high pressure gas of an air conditioning compressor and an outlet exposed to atmospheric pressure. A pressure sensitive snap-acting metal flexible diaphragm, having a central valve opening, extends across the chamber upper open end. An axial shaft, positioned in the valve opening, includes seal means on the underside of its head portion normally seated on the upper surface of the diaphragm to close the valve opening. A retainer is threaded on the shaft lower end and adjustably maintains an inner high pressure set point spring on the underside of the diaphragm. An outer spring retainer has an externally threaded shank mounted in the housing central bore and adjustably maintains an outer low pressure set point spring on the underside of the diaphragm. A contact ring is supported in the housing outlet whereby the diaphragm is held in electrically conductive relation with the ring by the outer spring such that the diaphragm is prestressed to flex downwardly away from the contact ring but not from the shaft head seal means in response to atmospheric pressure to open the contact without opening the valve opening.

1 Claim, 5 Drawing Figures

COMBINED ELECTRICAL CUT-OFF AND RELIEF VALVE

This invention relates to improvements in pressure relief valves for refrigerator systems and more particularly to a combination over pressure relief low pressure electrical cut-off valve for an automotive air conditioning system.

Prior art refrigeration units employing fluid compressors requiring accurate control frequently need both high pressure relief means and low pressure electrical cut-off means. The latter involves deenergizing the compressor from its drive means if the pressure of the refrigerant gas from the compressor falls below a predetermined value, such as when a leak occurs in the refrigeration system. Automobile air conditioning systems commonly use a refrigerant compressor driven by the automobile engine through an electromagnetic clutch with a coil. In one form of electromagnetic compressor clutch system a switch is provided having a refrigerant-filled capillary tube whose one end senses evaporator pressure. The other end of the tube connects with a refrigerant-filled bellows portion which includes an electrical switch. When the evaporator temperature falls below a predetermined value, the clutch of the compressor is deactivated. Upon the evaporator temperature increasing the clutch is reactivated. The cycling of the clutch on-and-off maintains the evaporator temperature above 32° F. to prevent freezing of the evaporator.

In such a cycling clutch system it is further undesirable to operate the compressor below a predetermined pressure of about 40 pounds per square inch (psi). A high pressure exceeding a predetermined value such as about 440 psi, for example, is similarly undesirable. Both the low pressure cut-off and high pressure relief means are normally separate valve devices.

It is an object of the present invention to provide an improved combination valve for achieving both over-pressure relief and low pressure electrical cut-off in an automotive air conditioning compressor system.

It is another object of the present invention to provide an improved combination valve as set forth in the above object wherein independent calibration means for both the over-pressure function and the low pressure electrical cut-off function allow individual adjustment of a low pressure set point spring and a high pressure set point spring without requiring disassembly of the valve.

These and other advantages of the present invention will be more readily apparent from the following detailed description, reference being had to the accompanying drawings in which a preferred embodiment is clearly shown.

Figure 1:
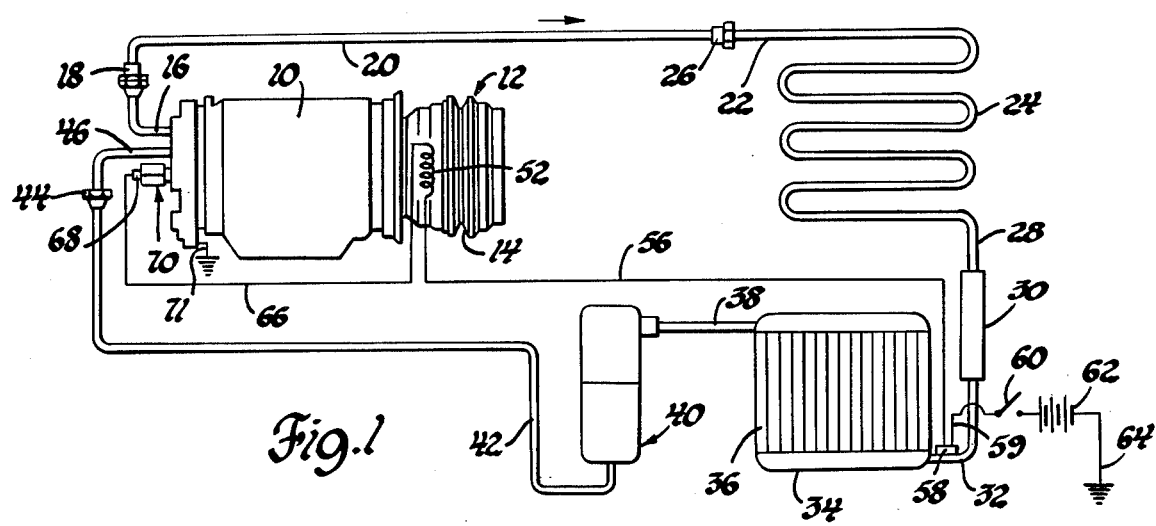
FIG. 1 is a somewhat schematic illustration showing an automotive air conditioning system for use with the present invention.

In FIG. 1 of the drawing, an air conditioning system including a refrigerant compressor 10 is illustrated. For details of a preferred form of compressor, reference may be had to U.S. Pat. No. 3,057,545 — Ransom et al, issued Oct. 9, 1962 and assigned to the assignee of the present application. The shaft of the compressor 10 is connected to a pulley of an electromagnetic clutch assembly 12 which is rotated by drive means such as the engine of an automobile through V-belts (not shown) which engage grooves 14 of the pulley. Reference may be had to U.S. Pat. No. 3,205,989 — Mantey, issued Sept. 14, 1965, which discloses an electromagnetic clutch suitable for use with the compressor 10 also assigned to the assignee of this application. The outlet 16 of the compressor is attached by connector 18 to a tubular member 20 which is in turn connected to inlet 22 of a condenser 24 by a connector 26. The condenser 24 is most conveniently located in the front of the vehicle engine compartment so that it is exposed to the flow of air through the grille for cooling and liquifying warm refrigerant discharged from the compressor. Outlet 28 of the condenser 24 is fluidly connected to an orifice tube expander 30 which decreases the pressure of liquid refrigerant discharged from the condenser. For a detailed disclosure of one form of orifice tube expander, reference may be made to U.S. Pat. No. 3,815,379 — Shearer, issued June 11, 1974, and assigned to the assignee of the present application.

The orifice tube expander 30 is connected to the inlet 32 of an evaporator 34. Liquid refrigerant in the evaporator is vaporized or "boiled" in vertical passes or tubes 36, each having fluid conveying portions in exterior fin surfaces formed thereon. The evaporator 34 has an outlet 38 which is connected to an inlet of a liquid accumulator 40. The accumulator 40 separates liquid from vaporous refrigerant and discharges the vaporous refrigerant through an outlet into a suction line 42 with the suction line in turn connected by a fitting 44 to the inlet 46 of the compressor 10.

Figure 2:
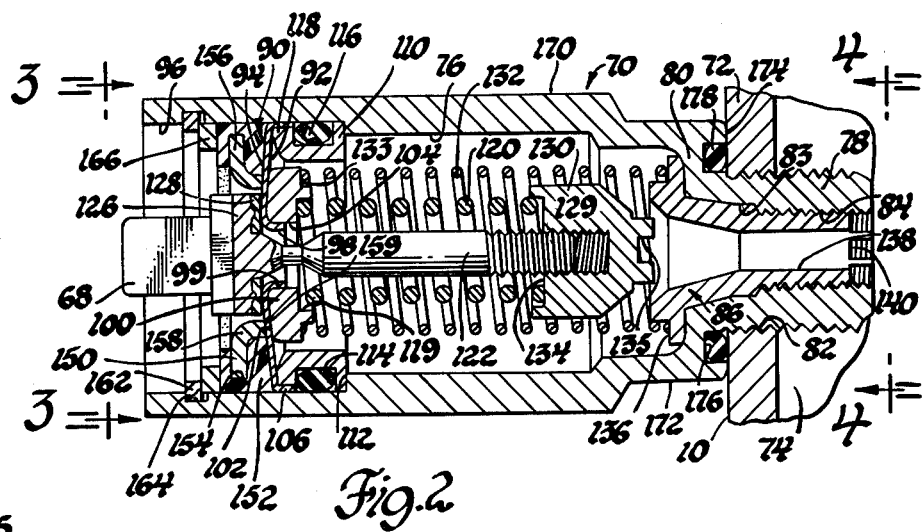
FIG. 2 is a vertical sectional view of the combined valve assembly showing the electrical contact portion in its closed circuit position.

The compressor 10 is cycled by the electromagnetic clutch 12, controlled by coil 52, such that the clutch transmits rotation of the car engine to the compressor 10 whenever the coil 52 is energized. Power is applied to the coil 52 by a D.C. automobile battery circuit through a conductor 56, cycling clutch thermostatic switch contact box 58, conductor 59, on-off switch 60, manually operated by the automotive driver to activate the air conditioning system; and battery 62 grounded by conductor 64. The other side of the coil 52 is connected by conductor 66 to terminal 68 of a combined electrical cut-off and relief valve shown generally at 70. As seen in FIG. 2 the valve 70 is shown installed in a wall 72 of the compressor discharge cavity 74. The circuit is completed by means of the valve being grounded by conductor 71 through the valve housing and compressor housing to be described.

The clutch 12 is normally disengaged whenever the air conditioner control on-off switch 60 is turned off while the clutch is normally engaged when the air conditioner control switch 60 is closed, except that a thermostatic switch on box 58 cycles the clutch. The switch includes a refrigerant-fill capillary tube (not shown) whose end is inserted between the fins of the evaporator 34 for sensing the evaporator temperature. The other end of the capillary tube connects with a refrigerant-filled bellows portion of the electrical thermostatic switch. When the evaporator temperature falls below a predetermined value, the clutch of the compressor is deactivated. Then the evaporator temperature increases, the clutch is activated once again. The cycling of the clutch on and off maintains the evaporator temperature above 32° F. to prevent freezing of the evaporator.

Turning now to FIG. 2, the valve 70 is shown in detail and includes a housing 72 of generally cylindrical configuration. The housing defines a generally circular valve chamber 76 with a high fluid pressure input tubular stem connection 78 extending centrally from the housing bottom end 80 for threaded insertion into the compressor discharge cavity 74 having a threaded opening 82. The stem 78 has a central bore 83 extending axially through the stem on the centerline of the housing with the central bore being internally threaded as shown at 84 for reception of an outer spring retainer generally indicated at 86.

A spring metal flexible diaphragm, generally indicated at 90, extends across the chamber left hand or upper open end so as to be exposed on its underside or inner surface 92 to the high fluid pressure within the chamber 76. The diaphragm 90 has its top or outward side 94 exposed to atmospheric pressure entering through the open end inlet portion 96 of the valve housing. The diaphragm 90 has a central valve opening 98 defined by an axially downwardly extending inner flange 99. The central valve opening flange 99 is circumscribed by a washer-like collar member 100 located on the underside of the diaphragm. The collar member 100 has a radially outwardly chamfered surface 102 which chamfer corresponds to the axially outward slope of the diaphragm with the diaphragm flange 99 mating in the central opening 104 of the collar for centering the same within the housing chamber.

Figure 5:
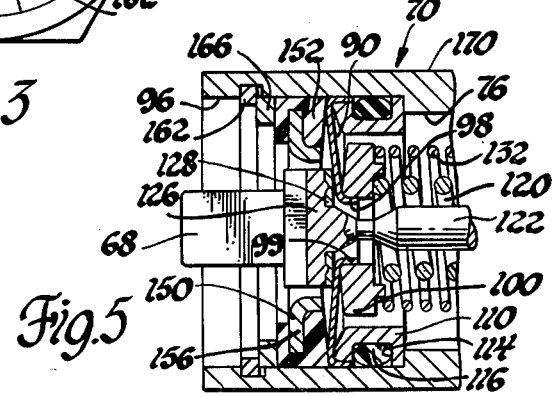
FIG. 5 is a fragmentary sectional view of the left hand portion of FIG. 2 with the electrical switch function shown in its open circuit position.

The diaphragm has an outer peripheral flange 106 having an overall outer diameter so as to snugly fit within the inner diameter of the counterbored portion 96 of the valve housing. The diaphragm 90 is a flexible snap-action member and in the preferred form is formed of stainless steel having a thickness of about 0.005 inches. As shown in FIG. 2 the diaphragm 90 is shown in its outward extended condition while diaphragm 90 is shown in FIG. 5 in its normal inwardly biased or original shape.

With reference to FIG. 2, an outer retainer generally indicated at 110, is positioned within the housing counterbore 96 so as to seat on the counterbore shoulder 112. The outer retainer 110 has a peripheral groove 114 formed therein for receiving an O-ring seal 116 to seal the chamber 76. The outer retainer 110 has a generally U-shaped cross-section with its one upper leg 118 being of a reduced diameter to allow for the insertion of the diaphragm outer flange 106 between the leg 118 and the counterbore 96. The diaphragm outer flange 106 is suitably secured to the retainer leg 118 as by welding to provide a sealed gas-tight connection. It will be noted that the inner bellows collar 100 has an inner counterbore portion 119 on its inner face dimensioned to seat the upper end of an inner helical compression spring 120.

An axial shaft member 122 extends through the valve opening 98 having a valve head 126 on its upper or left hand end. Seal means in the form of an annular flat washer seal 128 is secured on the underside of the shaft head 126. In this way the seal means seats on the diaphragm upper surface 94 such that said surface forms or provides a valve seat for the seal 128. The shaft member 122 has a threaded portion 129 on its lower or right hand end adjustably securing an inner spring retainer member 130 by virtue of being threaded on the free end of the shaft 122. It will be seen that the spring retainer member 130 has a diameter of a predetermined size such that said retainer is encircled by an outer coil spring 132.

The inner coil spring 120 has its upper end in seated engagement with counterbore 119 of the collar 100 and its opposite lower end seated in counterbore 134 of the inner spring retainer 130. The inner spring retainer 130 is designed to be axially adjustable upon rotation thereof on the shaft threaded end 129 by an adjusting tool means cooperating with engaging means in the form of a slot 135 formed on its lower end allowing the tool to axially adjust the inner spring retainer 130 with respect to the shaft 122. It will be seen that the inner compression coil spring biases the valve seat portion of the diaphragm upwardly against the shaft head seal means 128 to normally close the valve opening 98.

Figure 4:
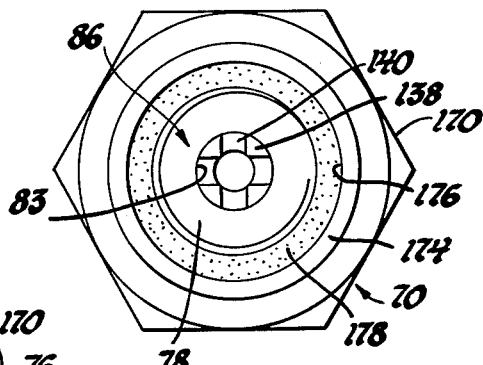
FIG. 4 is an end elevational view of the valve taken substantially along the line 4—4 of FIG. 2.

The outer low pressure set point coil spring 132 is disposed around the inner spring 120 in concentric fashion and has its one or upper end in engagement with an outer peripheral portion 133 of the collar 100 and its opposite or lower end seated against notched shoulder 136 of outer spring retainer 86. The outer spring retainer 86 is disposed in axially spaced relation below the inner spring retainer 130 and its externally threaded integral shank portion 138 is mounted in the housing central bore 83 for cooperative threaded engagement within the bore. As best seen in FIG. 4 retainer 86 has its outer end provided with tool engagement means in the form of crossed slots 140 formed therein for a tool to axially adjust the outer spring retainer for movement between extended and retracted positions upon rotation of the retainer stem by means of a tool engaging the slotted end portion of the retainer.

An L-section contact ring generally indicated at 150 is located in the housing counterbore 96 by means of an insulation washer generally indicated at 152, formed of suitable nonconducting material such as a phenolic composition. The washer 152 has an internal annular recess 154 which receives the outwardly directed base 156 of the contact ring while downwardly extending flange leg 158 of the contact ring has its free contact end 159 located to provide an electrical contact with the upper surface 94 of the diaphragm as seen in FIG. 2.

Figure 3:
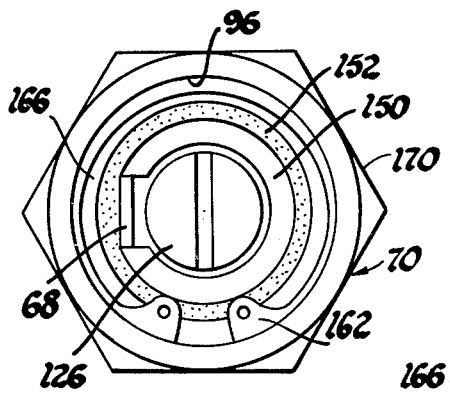
FIG. 3 is an end elevational view of the valve taken along the line 3—3 of FIG. 2.

The washer 152 is retained in housing counterbore 96 by means of a C-type snap ring 162 located in housing groove 164 with a spacer washer 166 located between the ring 162 and the insulation washer 152. It will be noted in FIG. 3 that the valve housing has an upper enlarged portion 170 formed with a hexagon cross section and a lower cylindrical portion 172. The lower portion 172 has a shoulder 174 formed with an annular downwardly opening groove 176 for reception of an O-ring seal 178 therein.

While the embodiment of the present invention as herein disclosed constitutes a preferred form, it is to be understood that other forms might be adopted.

We claim:

1. An improved combination high fluid pressure relief valve and low fluid pressure electrical contact cut-off control assembly for mounting in an opening of the discharge cavity of an automotive air conditioning compressor which is enabled for selective operation by electric circuit means, said control assembly comprising; a housing defining a valve chamber with a high fluid pressure input tubular stem connection extending centrally from the housing bottom end for insertion into the compressor discharge cavity, a central bore through said stem, said central bore being internally threaded, a spring metal flexible diaphragm having a central valve opening circumscribed by a collar on the underside thereof and having the capability for snap-action, said diaphragm extending across said chamber upper open end so as to be exposed on its underside to the fluid pressure within said chamber and exposed on its top side to atmospheric pressure, the periphery of said valve opening on said diaphragm top side defining a valve seat, an axial shaft extending through said valve opening and having a valve head on its upper end including seal means at the underside of said head and a threaded portion on its lower end; an inner spring retainer threaded on said shaft lower end, an outer spring retainer in axially spaced relation below said inner spring retainer having an externally threaded integral shank mounted in said central bore for cooperative threaded engagement therewith and for axial movement between axially extended and retracted positions upon rotation of said retainer stem therein, an axial passage in said shank terminating in an outer spring retainer entrance region between said passage and said valve chamber, an inner high pressure set point spring disposed between the said inner spring retainer and said diaphragm collar, said inner spring biasing said valve seat against said shaft head seal means, said inner spring being compressed to set a predetermined high pressure condition in said chamber at which said shaft seal means is unseated from said valve seat in response to said condition and the compression of said inner spring, thereby allowing the high pressure fluid in said compressor discharge cavity to escape to the atmosphere through said chamber whenever the pressure in the compressor discharge cavity is above said predetermined high pressure, said inner spring retainer having engaging means on its free end accessible by the insertion of an adjusting tool through said axial passage in said shank, whereby said inner spring retainer may be threadably adjusted axially upon rotation thereof by the adjusting tool cooperating with said engaging means, an outer low pressure set point spring disposed around said inner spring and extending between said outer spring retainer and said collar, a contact ring supported in said housing in electrically conductive relation with said diaphragm, said contact ring electrically insulatingly supported by an outer diaphragm stop member fixed in said chamber open end, said outer spring biasing said diaphragm against said contact ring to prevent flexing of said diaphragm away from said ring so that said circuit means may be closed, means in said shank for receiving an adjusting tool enabling the rotation of said outer spring retainer such that said outer spring is adjustably compressed by said outer spring retainer between said outer spring retainer and said collar to set a predetermined low pressure condition in said chamber at which said diaphragm is prestressed to flex downwardly and snap-actingly away from said contact ring but not from said seal means in response to the compression of said outer spring and said atmospheric pressure for opening said circuit means without opening said valve opening to prevent the compressor from operating whenever the pressure in the compressor discharge cavity is below said predetermined lower pressure.

* * * * *